H. A. GREAVES AND H. ETCHELLS.
ELECTRIC FURNACE.
APPLICATION FILED FEB. 12, 1919.
1,302,788.
Patented May 6, 1919.
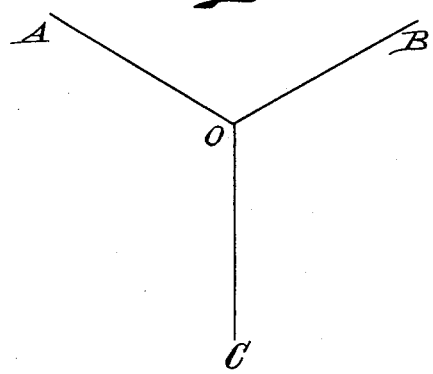
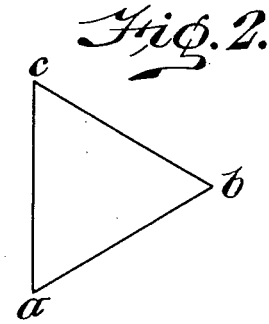
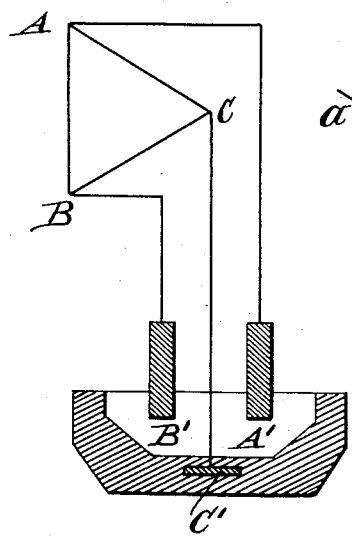
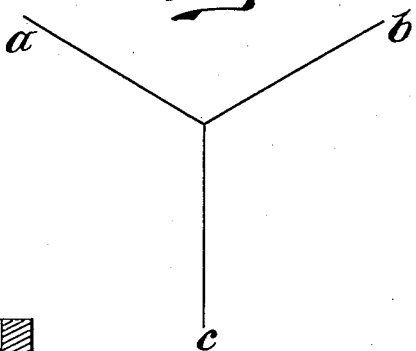
INVENTORS
Henry Arnold Greaves
Harry Etchells
BY
ATTORNEY.

UNITED STATES PATENT OFFICE.

HENRY ARNOLD GREAVES AND HARRY ETCHELLS, OF SHEFFIELD, ENGLAND.

ELECTRIC FURNACE.

1,302,788.  Specification of Letters Patent.  Patented May 6, 1919.

Application filed February 12, 1919. Serial No. 276,537.

*To all whom it may concern:*

Be it known that we, HENRY ARNOLD GREAVES and HARRY ETCHELLS, both subjects of the King of Great Britain, and residing in Sheffield, in the county of York, England, have invented certain new and useful Improvements in Electric Furnaces, of which the following is a true and exact description, reference being had to the accompanying drawings, which form a part thereof.

Our present invention is a modification of the invention set forth in British Patent No. 106,626 of 1st March, 1916, which consisted of a method of connecting a furnace with two upper electrodes and one lower electrode or conducting hearth, in such a way that as perfect a balance is obtained in a three phase alternating electric supply system as is practically possible. In the accompanying drawings, Figures 1 and 4 are diagrams of connections of the primary coils of the transformer, and Figs. 2 and 3 of the secondary.

In Figs. 1 and 2 on the accompanying drawings are shown the arrangement of secondary and primary windings respectively which we employed in connection with our previously mentioned patent, and we accomplished the object above described by connecting the terminals A and B of the two transformer secondary windings O A and O B one to each electrode or groups of upper electrodes in an electrode furnace. A third transformer winding O C was connected so that the terminal C was in circuit with the bottom electrode or conducting hearth of the furnace. The three windings O A, O B and O C were connected together in a common point O, known as the "star" point.

The primary windings of the transformers O A, O B and O C are $b\ c$, $a\ b$ and $c\ a$, respectively, and said primary windings are connected in mesh or delta.

By employing a different ratio of transformation between the primary and secondary windings O A, O B, on the one hand and O C on the other, in such a way that the voltage O C was lower than that of O A or O B, it was possible to obtain balanced power and power factor on the three phases of the supply system, providing a reading was taken when the secondary system was in a symmetrically loaded condition, *i. e.*, when equal currents flowed through electrodes connected to A and B respectively.

Our present invention consists in arranging the transformer windings for an electrode furnace similarly to those described above, but in such a way that the primary windings are arranged in "star" and the secondary windings in "delta".

Since it is obvious that two groups of electrodes may replace two single electrodes, and a number of transformer windings worked in parallel may replace one transformer winding; we will confine our description to the simplest case of a furnace with two upper electrodes, and one lower electrode or conducting hearth. It should always be understood that an arc is maintained at the end of each upper electrode or that some electrical resistance equivalent to an arc is thus interposed to take the place of the arc. The electrical resistance of the hearth may be less than that of one arc but is never more.

Our invention will be better understood on reference to the accompanying drawings, in which in Fig. 3 A' and B' represent two upper electrodes of a furnace connected to the terminal junctions of the meshed transformers secondary system A. B. C. C' represents the conductive hearth or third electrode connected to junction C.

The three transformer secondary windings A, B, B C and C A have primary windings O $c$, O $b$, O $a$, which are arranged to connect in a common point O, as shown in Fig. 4. The outer terminals $a$, $b$, $c$, are each connected to one phase of a normal 3 phase alternating current supply system.

If the electrical resistance of the conducting hearth C' was equal to that maintained at the tips of either electrode A' or B' the three transformer secondary windings A B, B C, C A, would maintain equal voltages between their terminals. The transformer primary windings would also maintain equal voltages O $a$, O $b$, O $c$ and thus form a symmetrical star connection.

But in practice the electrical resistance C' may be lower than that of A' or B' and may in fact drop down to zero.

By our invention we arrange the ratio of transformation between the various transformer windings in such a way that the three primary phases of electrical supply are equally loaded for power and power factor, when the secondary system comprised by the furnace is symmetrically loaded, viz: when the two upper electrodes are each conveying equal power.

The extreme cases of variation to be met are those where the resistance of the hearth is *nil* and that where its resistance electrically becomes equal to the electrical resistance maintained at the tip of either upper electrodes.

Assuming the electrical resistance of the hearth to be negligible as to be relatively equal to zero, the voltages of the three primary windings O $a$, O $b$, O $c$, arranged in star or multiples of the same must be in relation to each other as $\sqrt{2}:\sqrt{2}:(\sqrt{3}-1)$ or as 1.414:1.414:.732.

The voltages of the transformer secondary windings A B, B C, C A must be in the ratio of $\sqrt{2}:1:1$, arranged in delta or multiples of same, in such a way that the $\sqrt{2}$ secondary is excited by $(\sqrt{3}-1)$ primary winding.

As the electrical resistance of the hearth rises the relative voltage of A B to A C and B C will decrease, and that of O $c$ to O $a$ and O $b$ will increase, until the system becomes perfectly symmetrical with O $c$=O $a$,=O $b$, and A B=B C=C A, when resistance C'=resistance B'=resistance A'. Thus for a maximum hearth resistance equal to the electrical resistance maintained at the tip of one electrode or multiple of electrodes, the primary voltage ratios are equal and the secondary voltages are equal.

In this latter case the conducting hearth may, of course, be replaced by a third electrode in the top of the furnace, which maintains an electrical resistance and tension with the contents of the furnace equal to A' and B'.

Having now described our invention, what we claim as new and desire to secure by Letters Patent is:

1. In connection with arc electrode furnaces, the improved method of distributing three phase currents so that the supply phases tend to have balanced loads, consisting in the arrangement of three transformer secondary windings grouped in "delta" fashion, the terminal junctions of which are connected respectively to two upper electrodes or groups of electrodes and a third electrode or conductive hearth, and three transformer primary windings grouped in "star" fashion, the ratio of transformation between the various transformer windings being arranged so that the three primary phases of electrical supply are equally loaded for power and power factor when the secondary system comprised by the furnace is symmetrically loaded, that is when the two upper electrodes are each conveying equal power, substantially as herein described.

2. In connection with the arrangement claimed in claim 1, the specific voltage relationship between the voltages impressed on the separate transformer primary and secondary windings to create a balanced system when the hearth of the furnace has no electrical resistance and for all intermediate electrical values of the furnace hearth up to a point where that resistance equals that normally maintained at the tip of each upper electrode or group of electrodes supplied by an equivalent phase of secondary current supply, as herein set forth.

HENRY ARNOLD GREAVES.
HARRY ETCHELLS.